(12) United States Patent
Funke

(10) Patent No.: US 10,508,705 B2
(45) Date of Patent: Dec. 17, 2019

(54) VIBRATION DAMPER ARRANGEMENT

(71) Applicant: Hitachi Automotive Systems Europe GmbH, Schwaig/Oberding (DE)

(72) Inventor: Joachim Funke, Otzberg (DE)

(73) Assignee: Hitachi Automotive Systems, Ltd., Ibaraki (DE)

(*) Notice: Subject to any disclaimer, the term of this patent is extended or adjusted under 35 U.S.C. 154(b) by 202 days.

(21) Appl. No.: 15/576,987

(22) PCT Filed: May 30, 2016

(86) PCT No.: PCT/EP2016/000884
§ 371 (c)(1),
(2) Date: Jun. 4, 2018

(87) PCT Pub. No.: WO2016/192847
PCT Pub. Date: Dec. 8, 2016

(65) Prior Publication Data
US 2019/0040927 A1    Feb. 7, 2019

(30) Foreign Application Priority Data

May 29, 2015  (DE) .......... 10 2015 006 721

(51) Int. Cl.
*F16F 9/46*  (2006.01)
*F16F 9/53*  (2006.01)
(Continued)

(52) U.S. Cl.
CPC .............. *F16F 9/532* (2013.01); *B60G 13/08* (2013.01); *B60G 17/016* (2013.01); *F16F 9/064* (2013.01);
(Continued)

(58) Field of Classification Search
CPC .. F16F 9/532; F16F 9/064; F16F 9/065; F16F 9/19; F16F 9/46; F16F 9/516;
(Continued)

(56) References Cited

U.S. PATENT DOCUMENTS 5,586,627 A * 12/1996 Nezu ............... B60G 17/08
188/266.6
5,901,820 A *  5/1999 Kashiwagi .......... F16F 9/46
188/266.6
(Continued)

FOREIGN PATENT DOCUMENTS

DE       19702550 A1    8/1997
DE    102005048949 B3   12/2006
DE    102010008720 A1   12/2010

OTHER PUBLICATIONS

International Search Report dated Oct. 14, 2016 for WO 2016/192847 A1.

*Primary Examiner* — Thomas W Irvin
(74) *Attorney, Agent, or Firm* — Abelman, Frayne & Schwab

(57) ABSTRACT

The invention relates to a vibration damper arrangement, in particular for damping compression and rebound forces on motor vehicles, which comprises a pressure medium cylinder (1), in which a piston (2) with a piston rod (3) is guided axially displaceably, which piston (2) divides the pressure medium cylinder (1) into a compression chamber (4) and a rebound chamber (5), a gas pressure accumulator (8) also being provided for volume compensation of the piston rod (3), which gas pressure accumulator (8) is connected to the compression chamber (4) by way of at least one first check valve (6) which can open toward the compression chamber (4), and a second check valve (7) which can open toward the rebound chamber (5) and, parallel thereto, at least one first
(Continued)

controllable operating valve (12) being provided between the compression chamber (4) and the rebound chamber (5).

5 Claims, 2 Drawing Sheets

(51) Int. Cl.
*F16F 9/06* (2006.01)
*F16F 9/19* (2006.01)
*B60G 13/08* (2006.01)
*B60G 17/016* (2006.01)

(52) U.S. Cl.
CPC .............. *F16F 9/065* (2013.01); *F16F 9/19* (2013.01); *F16F 9/46* (2013.01); *B60G 2206/41* (2013.01); *B60G 2500/10* (2013.01); *F16F 2222/06* (2013.01); *F16F 2224/043* (2013.01); *F16F 2228/066* (2013.01)

(58) Field of Classification Search
CPC ............ F16F 2222/06; F16F 2224/043; F16F 2228/066; B60G 13/08; B60G 17/016; B60G 17/08; B60G 2206/41; B60G 2500/10
USPC .................................... 188/318, 281, 322.13
See application file for complete search history.

(56) References Cited

U.S. PATENT DOCUMENTS

| | | | | |
|---|---|---|---|---|
| 5,996,748 A * | 12/1999 | Nezu | ........................ | F16F 9/46 188/313 |
| 6,394,238 B1 * | 5/2002 | Rogala | .................. | B60G 13/14 188/266.2 |
| 6,464,048 B1 * | 10/2002 | Groves | ..................... | F16F 9/06 188/266.6 |
| 7,699,147 B2 * | 4/2010 | Preukschat | ............ | B60G 17/04 188/282.4 |
| 8,307,965 B2 * | 11/2012 | Foster | ..................... | F16F 9/516 188/281 |
| 8,997,950 B2 * | 4/2015 | Ogawa | ..................... | B61F 5/24 188/266.2 |
| 9,550,545 B2 * | 1/2017 | Murakami | ............. | B62K 25/28 |
| 9,683,625 B2 * | 6/2017 | Kurita | ....................... | F16F 9/50 |
| 9,879,744 B2 * | 1/2018 | Haller | ................... | B60N 2/505 |
| 9,945,441 B2 * | 4/2018 | Ogawa | ..................... | B61F 5/24 |
| 10,035,397 B2 * | 7/2018 | Anderson | ............. | B60G 13/14 |
| 10,076,943 B2 * | 9/2018 | Masamura | ........... | B60G 17/015 |
| 10,124,644 B2 * | 11/2018 | Kurita | .................... | B62K 25/04 |
| 2002/0121416 A1 * | 9/2002 | Katayama | .............. | B60G 15/12 188/314 |
| 2006/0175166 A1 * | 8/2006 | Fischer | ................ | B60G 17/056 188/322.13 |
| 2009/0288924 A1 * | 11/2009 | Murray | ................... | F16F 9/466 188/322.13 |
| 2014/0216871 A1 * | 8/2014 | Shibahara | ................ | B61F 5/24 188/313 |
| 2017/0297591 A1 * | 10/2017 | Ogawa | ..................... | B61F 5/24 |
| 2018/0154728 A1 * | 6/2018 | Giovanardi | ........... | B60G 17/04 |
| 2018/0281550 A1 * | 10/2018 | Masamura | ........... | B60G 17/056 |

* cited by examiner

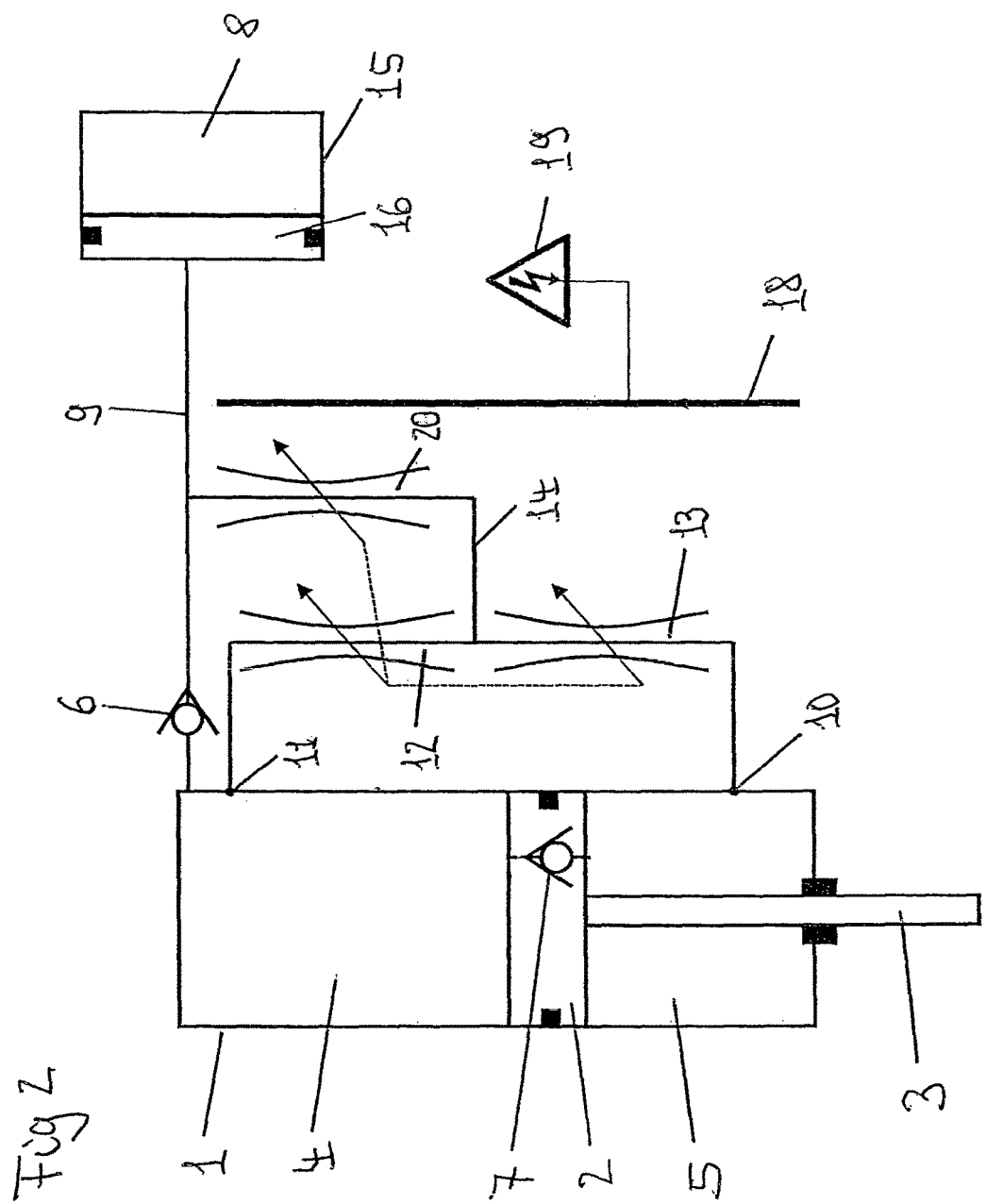

VIBRATION DAMPER ARRANGEMENT

CROSS-REFERENCE TO RELATED APPLICATIONS

This application claims priority to PCT/EP2016/000884, filed 30 May 2016, which claims benefit to German Application No. 102015006721.4 filed on 19 May 2015.

BACKGROUND OF THE INVENTION

Field of the Invention

The invention relates to a vibration damper arrangement, in particular for damping compression and rebound movements preferably on motor vehicles, in accordance with the preamble of patent claim 1.

Description of Related Art

Vibration damper arrangements of this type are frequently used as shock absorbers in motor vehicles. Here, the shock absorbers consist substantially of a cylinder which is filled with liquid and in which a piston which is fastened to a piston rod is guided axially. Here, the piston divides the pressure medium cylinder into a compression chamber and into a rebound chamber, through which the piston rod runs. In the case of an axial movement of the piston rod with respect to the cylinder, the liquid usually flows via operating or damping valves from the one chamber into the other chamber, the vibrations being damped to a greater or lesser extent as a result of the type of operating valves. In order to compensate the piston rod volume and the thermal expansion of the liquid, the compression chamber is usually connected to a gas pressure accumulator. In order to prevent the cavitation in the rebound chamber, the compression chamber is usually loaded with a pilot pressure of approximately from 20 to 30 bar.

DE 10 2007 026 378 A1 has disclosed an electro-rheological vibration damper which can be controlled from the outside by way of electric control means during the vibration operation. This is a vibration damper, in particular for motor vehicles, the pressure medium of which vibration damper is an electro-rheological liquid. For control purposes, a throttle gap is arranged as operating valve in the pressure medium cylinder, which throttle gap connects the two pressure medium chambers to one another. Here, the throttle gap is divided by a gap section point into a first and a second gap section, the first gap section being connected to the compression chamber and the second gap section being connected to the rebound chamber of the pressure medium cylinder. A non-controllable bypass gap from the gap section point as far as the compression chamber is also arranged parallel to the first gap section, at the end of which bypass gap a check valve which can open toward the compression chamber is provided. For electric control purposes of the damper force, a tubular electrode is arranged around the first and second throttle gap section, which tubular electrode can be loaded with a controlled electric voltage, by way of which the viscosity in the throttle gaps is changed. In an extension toward the pressure medium chamber, a gas pressure accumulator is also arranged adjacently with respect to the compression chamber, which gas pressure accumulator is provided for the compensation of the piston rod volume. Said gas pressure accumulator is separated from the compression chamber by way of an axially displaceable piston without a piston rod. Here, the pilot pressure in the gas compression chamber of the gas pressure accumulator is set to a value of from at least 20 to 30 bar in order to prevent the cavitation. A pilot pressure which is as high as this has the disadvantage, however, that it requires a complicated seal which is subject to increased wear on account of the relatively high friction.

DE 10 2010 051 872 A1 has disclosed a vibration damper arrangement for motor vehicles, which vibration damper arrangement comprises an electro-rheological operating valve and a plurality of check valves. Here, said valves are arranged in such a way that the pilot pressure in the gas pressure accumulator is decoupled from the operating pressure in the compression chamber or rebound chamber, and only a low pilot pressure of at most 10 bar is therefore required without the risk of cavitation. To this end, a pressure medium cylinder is provided with a rebound chamber and a compression chamber which are separated by way of an axially displaceable piston, a check valve which can open toward the rebound chamber being arranged in the piston between the rebound chamber and the compression chamber. Here, the compression chamber is connected to a gas pressure accumulator, in which a check valve which can open toward the compression chamber is arranged. The electro-rheological operating valve which can be regulated electrically is connected by way of one connector side to the rebound chamber and by way of the other connector side to the gas pressure accumulator. In the case of a damper arrangement of this type, an asymmetry of the distribution of force between the rebound direction and the compression direction is produced, which asymmetry is dependent on the ratio between the piston rod cross section and the piston rod annular area (piston cross section minus piston rod cross section), since different pressure areas act on the two sides of the piston face as a result of the piston rod. Since, however, the cross section of the piston rod is usually measured in accordance with its mechanical loading which is provided to be greater at the front axle than at the rear axle, in particular, in the case of vehicle shock absorbers, different asymmetries are produced which usually do not coincide with the asymmetries which are desired on account of the driving comfort. This can admittedly be taken into consideration by way of electro-rheological valves with special gap connection points, with the result that a special electro-rheological throttling valve with different gap connection points would have to be provided for each piston rod cross section. Since, in the case of dampers having an electro-rheological throttling valve, they are usually integrated into the cylinder tube, a separate damper arrangement would have to be produced for each piston rod cross section which is provided, which is disadvantageous, in particular, in the case of serial parts such as shock absorbers.

BRIEF SUMMARY

The invention is therefore based on the object of improving a damper arrangement of the type mentioned at the outset, in such a way that the desired asymmetry or symmetry between the rebound stages and compression stages can be achieved independently of the piston rod cross section which is provided.

Said object is achieved by way of the invention which is specified in patent claim 1. Developments and advantageous exemplary embodiments of the invention are specified in the subclaims.

The invention has the advantage that a setting of the asymmetry of the compression stage and the rebound stage of the vibration damper is possible by way of the provided connection of at least two check valves and at least two electro-rheological or magneto-rheological operating valves, without it being necessary to this end for the cross sections or diameter ratios of the piston rod and the piston to be taken into consideration. The asymmetry can thus additionally take place by way of the arrangement and control of the operating valves, with the result that the cross sections of the piston rod and the piston can be defined exclusively according to mechanical requirements. It is therefore also advantageously possible to design a homogeneous vibration damper for different asymmetries between the compression stage and the rebound stage solely by way of the connection and control of the operating valves, in order to realize the desired driving comfort without changing the mechanical properties of the vibration damper parts. Therefore, homogeneous damper embodiments can be used inexpensively as serial parts for different damping characteristics or different vehicle configurations.

The invention has the advantage, furthermore, that only two or three controllable operating valves and two simple check valves are necessary for the geometry-independent setting of the asymmetry of the rebound stage and the compression stage, in order for it to be possible to realize different driving experience stages even in the case of different vehicle configurations. Here, the invention has the advantage at the same time that this is even possible by way of a gas pressure accumulator with a low pilot pressure of at most 10 bar, as a result of which the risk of cavitation is reduced. As a result of the use of controllable magneto-rheological or electro-rheological operating valves, it is advantageous that the settings of different asymmetries between the compression stage and the rebound stage can take place without appreciable switching delays, with the result that very precise control of the compression stage and the rebound stage is possible during driving operation.

Since the asymmetry between the rebound stage and the compression stage can be controlled by way of at least two independent operating valves, the latter can advantageously be loaded with a common control voltage, with the result that the same electrodes can advantageously be used for the control of the operating valves.

In the case of one special embodiment of the invention having electro-rheological operating valves which are integrated into the pressure medium cylinder, this has the advantage, in particular, that the operating valves can also be arranged outside the cylinder tubes coaxially between the pressure medium cylinder and the cylinder tubes as parallel or spiral gaps which are configured by way of at least two insulated cylinder tubes which are spaced apart and are at the same time the electrodes.

A further special embodiment of the invention having at least three controllable operating valves has the advantage that, as a result, the rebound stage can be damped by way of three operating valves, whereas the compression stage is damped by three operating valves with a reduced throughflow quantity, as a result of which the rebound stage is generally damped to a greater extent than the compression stage in the case of an identical control voltage, as a result of which an asymmetry is produced which largely corresponds to the driving experience stages which are provided in reality, with the result that only small asymmetry adaptations usually still have to take place by means of the control voltage. As a result, the control of higher damping values during rebound operation than compression operation is possible by way of lower control voltage changes, as a result of which the control accuracy can be increased. At the same time, the invention has the advantage that the geometry-independent asymmetry setting can be realized not only by way of electro-rheological operating valves, but rather also by way of magneto-rheological and rapid hydraulic operating valves.

BRIEF DESCRIPTION OF THE DRAWINGS

The invention will be described in greater detail using one exemplary embodiment which is shown in the drawing, in which:

FIG. 2 shows a hydraulic operating and control circuit of an electro-rheological damper arrangement having three controlled throttling valves and two check valves.

DETAILED DESCRIPTION

Figure 1:
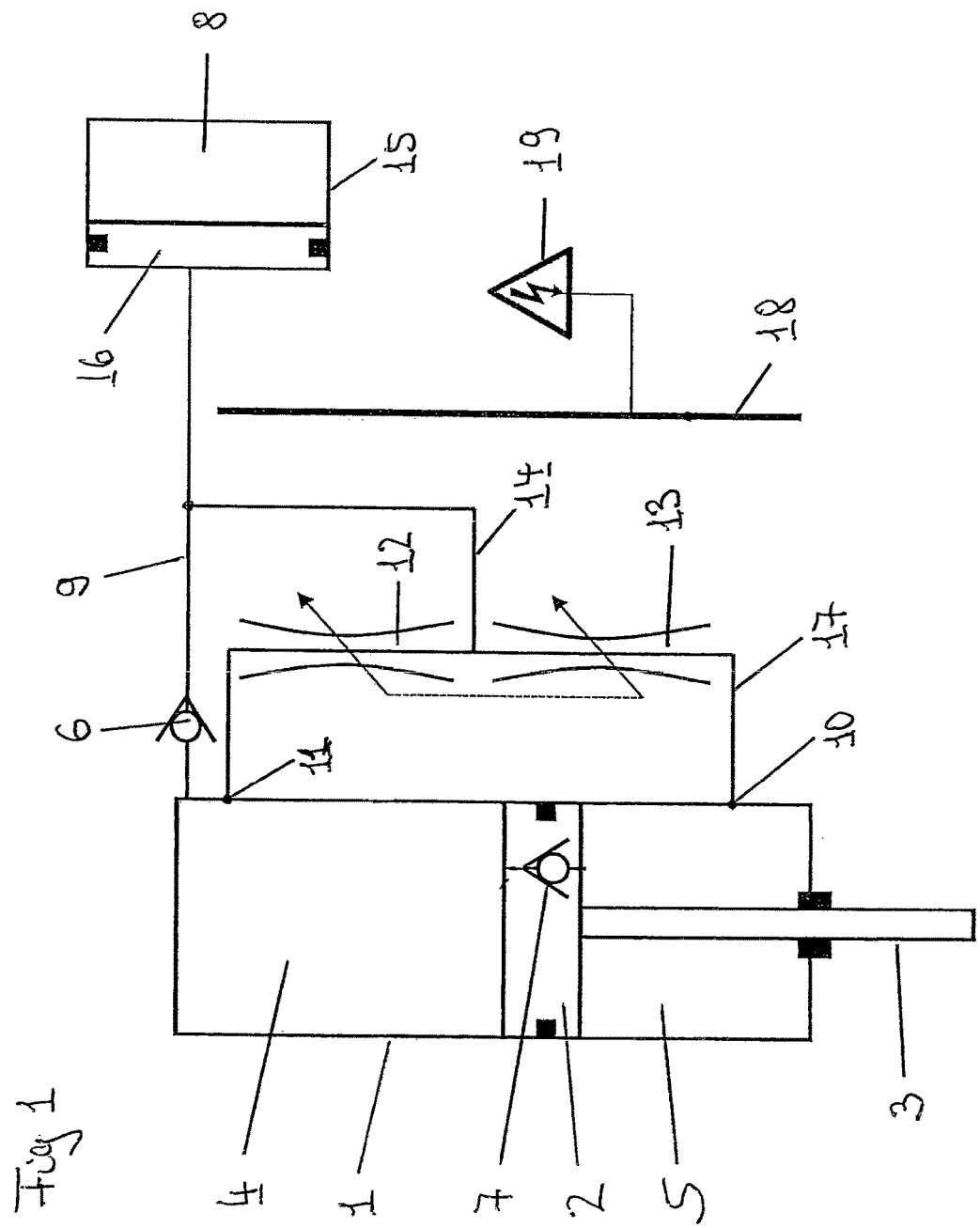
FIG. 1 shows a hydraulic operating and control circuit of an electro-rheological damper arrangement having two controlled throttling valves and two check valves.

FIG. 1 shows a hydraulic operating and control circuit of an electro-rheological damper arrangement which comprises a pressure medium cylinder 1 and a longitudinally displaceable piston 2 which is provided with a piston rod 3, the piston 2 dividing the pressure medium cylinder 1 into a compression chamber 4 and a rebound chamber 5, through which the piston rod 3 runs. Here, the compression chamber 4 is connected via a first check valve 6 which opens or can open toward the latter to a gas pressure accumulator 8 via a first pressure medium line 9. At the same time, the compression chamber 4 is connected via a first overflow bore 11 to a first controllable electro-rheological operating valve 12 and, following this, a second controllable electro-rheological operating valve 13, and the outlet thereof is connected via a second overflow bore 10 to the rebound chamber 5. Here, a pressure medium branch 14 to the gas pressure accumulator 8 and the first check valve 6 is provided between the two controllable operating valves 12, 13. In addition, a second check valve 7 which is open or can open toward the rebound chamber 5 is still arranged in the piston 2.

A damper arrangement of this type is preferably used as a shock absorber in motor vehicles and serves mainly to damp the driving-induced vibrations which act on the wheels in both active directions with respect to the vehicle chassis as far as possible. Damper arrangements of this type can also be used for other vibration damping operations and are therefore a generally common vibration damper arrangement.

In practice, a shock absorber of this type usually consists of a closed aluminum or steel cylinder as pressure medium cylinder 1, with a sealed piston rod leadthrough, in which pressure medium cylinder 1 an electro-rheological liquid as hydraulic damping means is situated as pressure medium. A sealed piston 2 is guided axially displaceably in the filled pressure medium cylinder 1, to which piston 2 the piston rod 3 is fastened which is preferably connected to the chassis of the vehicle. On the opposite side, the pressure medium cylinder 1 with the compression chamber 4 is then fastened to a steering knuckle, on which a vehicle wheel is situated.

A gas pressure accumulator 8 is also provided for compensating for the piston rod volume and for compensating for a thermal expansion of the electro-rheological liquid, which gas pressure accumulator 8 in practice preferably has a cylindrical pressure medium housing 15 with a pressure medium connector. An axially guided gas pressure piston 16 without a piston rod is provided in the pressure medium housing 15, which gas pressure piston 16 seals a gas which is introduced into the gas pressure housing 15 at a low pilot pressure of from 1 to 10 bar with respect to the pressure medium cylinder 1. To this end, the first pressure medium line 9 is attached between the gas pressure accumulator 8 and the pressure medium chamber 4, in which pressure medium line 9 a conventional first check valve 6 without a throttling action is provided, which check valve 6 is open or at least can open toward the compression chamber 4 and is closed or can close toward the gas pressure accumulator 8. Here, however, the gas pressure accumulator 8 can also be connected directly to the compression chamber 4 via the first check valve 6, which results in a simple, integrating, compact unit between the gas pressure accumulator 8 and the pressure medium cylinder 1 with the electro-rheological liquid. Gas pressure accumulators 8 of this type can also be integrated by way of an additional cylinder tube in the shock absorber, which additional cylinder tube encloses the pressure medium cylinder 1. Dampers of a design of this type are called twin tube dampers.

Furthermore, a second conventional check valve 7 without a throttling valve is also additionally arranged in the piston 2 of the pressure medium cylinder 1, which check valve 7 is open or can open toward the rebound chamber 5 and is closed or can close toward the compression chamber 4. A second check valve 7 of this type can also, however, be arranged outside the piston 2 by means of two pressure medium lines which connect the compression chamber 4 and the rebound chamber 5 to one another.

The two operating valves 12, 13 which are configured as controllable electro-rheological throttling valves 12, 13 are provided between the compression chamber 4 and the rebound chamber 5 of the pressure medium cylinder 1 for damping the compressing compression vibrations or the rebounding rebound vibrations between the vehicle chassis and the respective wheel. These are preferably two narrow throttle gaps which are of spiral configuration coaxially with the aid of a further cylinder outer tube 18 in the housing of the pressure medium cylinder 1. Here, the inner pressure medium cylinder 1 is at the same time configured as an electrically conducting electrode which is surrounded coaxially by the second cylinder outer tube 18 as a further electrode, by way of which an electric field can be generated which changes the viscosity of the electro-rheological liquid which flows through. Controllable electro-rheological throttling valves of this type are known from DE 10 2013 003 841 A1, which throttling valves are integrated into a vibration damper. However, operating valves 12, 13 of this type can also be configured as throttling valves for magneto-rheological liquids in a magnetic field. Here, the function of the invention does not fundamentally depend on the type of liquid control of the throttling valves.

A cylinder outer tube 18 is provided as electro-rheological throttling valves 12, 13 on the outer surface of the pressure medium cylinder 1. A pressure medium branch 14 by means of an opening in the center of the cylinder outer tube 18 is arranged in the body of the cylinder tube on the outer surface between the cylinder outer tube 18 and the gas pressure accumulator 8.

It is decisive here for the function of the invention that the second throttling valve 13 between the outlet of the first check valve 6 and the pressure medium inlet of the gas pressure accumulator 8 is connected via a first pressure medium line 9 directly to the gas pressure accumulator 8 and secondly via a second pressure medium line 17 to the rebound chamber 5. This is because an operating pressure is never connected directly to the gas volume in the gas pressure accumulator 8 in the case of said arrangement of the two check valves 6, 7 and the operating valves 12, 13, but rather is always connected via one of the two operating valves 12, 13. The asymmetry of the damper arrangement is therefore largely independent of the cross-sectional areas of the piston rods or the piston rod annular areas (piston cross section minus piston rod cross section), and can be controlled exclusively by way of the two operating valves 12, 13. To this end, in compression mode, the electro-rheological liquid flows mainly via the idealized second check valve 7 in an undamped manner from the compression chamber 4 into the rebound chamber 5, since the first check valve 6 is closed toward the gas pressure accumulator 8 here. At the same time, part of the electro-rheological liquid flows out of the rebound chamber 5 via the first overflow bore 10 into the pressure medium line 17, the second electro-rheological operating valve 13 and the pressure medium branch 14 into the gas pressure accumulator 8 on account of the piston rod volume which additionally dips into the rebound chamber 5. In addition, a further part of the electro-rheological liquid flows via the second overflow bore 11, the first operating valve 12 and the pressure medium branch 14 into the gas pressure accumulator 8. Here, by way of a corresponding control voltage, the damping action between the vehicle chassis and the vehicle wheel can be set in compression operation by way of the two operating valves 12, 13 in accordance with the desired driving comfort. Here, the damping action which is controlled in this way in compression operation is also independent of the damping action in rebound operation, with the result that the compression damping action can be set separately by way of the stipulation of the control voltage as a result.

In rebound operation, in contrast, the second check valve 7 is closed toward the compression chamber 4, with the result that the electro-rheological liquid flows to the compression chamber 4 via the first overflow bore 10, the second pressure medium line 17, the second electro-rheological operating valve 13, the pressure medium branch 14 and the first check valve 6 which is open toward the compression chamber 4. Since the first operating valve 12 is bypassed by way of the pressure medium branch 14, the damping action is controlled exclusively by way of the second electro-rheological operating valve 13 in rebound operation. Since the pressure in the rebound chamber 5 is dependent substantially on the piston rod annular area (piston cross section minus piston rod cross section) in rebound operation, the rebound damping action can be fixed in accordance with the stipulation of the desired driving comfort by way of a corresponding control voltage in the second operating valve 13. Here, in the case of a comparatively great piston rod annular area, a comparatively high damping action can already be set independently of the compression operation by way of a small control voltage in rebound operation. As a result, it is possible independently of the cross-sectional ratios between the piston rod and the piston to control independent rebound damping actions and/or compression damping actions, it also being possible for the desired asymmetrical ratio thereof to be set by way of corresponding stipulations of the control voltages.

FIG. 2 shows a further embodiment of the invention with three electro-rheological throttling valves 12, 13, 20 and two check valves 6, 7. Here, said vibration damper arrangement consists, just like that according to FIG. 1, of a pressure medium cylinder 1 which is divided into a compression chamber 4 and a rebound chamber 5 by way of an axially displaceable piston 2. A second check valve 7 which is open or can open toward the rebound chamber 5 is likewise arranged in the piston 2, which check valve 7 acts as an ideal check valve which has practically no throttling action in the open state. Two electro-rheological operating valves 12, 13 are likewise connected in series between the compression chamber 4 and the rebound chamber 5. Said operating valves are preferably configured as two separate spiral throttle gaps between the pressure medium cylinder 1 and a cylinder outer tube 18 which surrounds the latter coaxially, the two cylinder tubes 1, 18 at the same time being the controllable electrodes.

Furthermore, the vibration damper arrangement according to FIG. 2 also has a gas pressure accumulator 8 with only a low pilot pressure of approximately from 1 to 10 bar, which gas pressure accumulator 8 is connected via a first pressure medium line 9 to the compression chamber 4. A first check valve 6 is likewise arranged in said first pressure medium line 9, in order to decouple the gas pressure accumulator 8 from the compression chamber 4 in compression operation.

Furthermore, the vibration damper arrangement according to FIG. 2 comprises a pressure medium branch 14 between the two first and second operating valves 12, 13, which pressure medium branch 14 is connected to the gas pressure accumulator 8 in the first pressure medium line 9 downstream of the outlet of the first check valve 6. In contrast to the vibration damper arrangement according to FIG. 1, a further third electro-rheological operating valve 20 is provided in the pressure medium branch 14, by way of which third electro-rheological operating valve 20 the electro-rheological liquid can be controlled by way of the first and third operating valves 12, 20 which are connected in parallel, even in rebound operation. Here, the third electro-rheological operating valve 20 achieves a situation where the electro-rheological liquid flows into the compression chamber 4 both through the second electro-rheological valve 13 and the two first and third operating valves 12, 20 which are connected in parallel to one another and in series with respect to said second electro-rheological valve 13, even in rebound operation during settling of the vehicle chassis. Since, in the case of passenger motor vehicles, the rebound vibrations are as a rule to be damped to a more pronounced extent than the compression vibrations on account of satisfactory driving comfort, said rebound vibrations can be damped by way of the three controllable operating valves 12, 13, 20 to a greater extent than in compression operation with an open second check valve 7, where mainly only the two operating valves 12, 20 which are then connected in series and the second operating valve 13, which is flowed through in parallel to the operating valve 12, are active with a reduced throughflow quantity. To this extent, the rebound vibrations are already damped to a greater extent than the compression vibrations in the case of an identical control voltage, as a result of which there is an asymmetry without control voltage changes between the rebound operation and compression operation, which asymmetry is desired in practice, for instance. Here, the asymmetry can also additionally be changed by virtue of the fact that the control voltage is changed during the rebound movement in accordance with the precisely desired asymmetry. As a result, in the case of the embodiment according to FIG. 2, an asymmetrical vibration damping action can advantageously be set in a comparatively great range by way of a low control voltage change. Here, both during rebound operation and compression operation, all the electro-rheological operating valves 12, 13, 20 are advantageously controlled by the same control voltage 19, with the result that the same viscosity prevails in all the control gaps of the operating valves 12, 13, 20. As a result, all the operating valves 12, 13, 20 can advantageously be controlled by way of only one control device and the same electrodes.

The invention claimed is:

1. A vibration damper arrangement, in particular for damping compression and rebound forces on motor vehicles, which comprises a pressure medium cylinder, in which a piston with a piston rod is guided axially displaceably, which piston divides the pressure medium cylinder into a compression chamber and a rebound chamber, a gas pressure accumulator also being provided for volume compensation of the piston rod, which gas pressure accumulator is connected to the compression chamber by way of at least one first check valve which can open toward the compression chamber, and a second check valve which can open toward the rebound chamber and, parallel thereto, at least one first controllable operating valve being provided between the compression chamber and the rebound chamber, characterized in that a second controllable operating valve is connected in series with respect to the first operating valve, which second controllable operating valve is connected on one side to the first operating valve and on the other side to the rebound chamber, a pressure medium branch being provided between the two operating valves, which pressure medium branch is connected to the gas pressure accumulator and the outlet of the first check valve, the gas pressure accumulator having only a small pilot pressure.

2. The vibration damper arrangement as claimed in claim 1, characterized in that the controllable operating valves are configured as electro-rheological throttling valves which can be controlled by way of a common electric high voltage.

3. The vibration damper arrangement as claimed in claim 1, characterized in that a third controllable operating valve is arranged in the pressure medium branch between the gas pressure accumulator and, in the rest position, the second operating valve.

4. The vibration damper arrangement as claimed in claim 1, characterized in that the operating valves are configured by way of throttle gaps coaxially with respect to the pressure medium cylinder, which throttle gaps can be controlled by way of a common control voltage source.

5. The vibration damper arrangement as claimed in claim 1, characterized in that the second check valve is integrated into the piston and is configured in such a way that it has virtually no throttling action in the open compression mode.

* * * * *